United States Patent
Heino et al.

(10) Patent No.: US 7,340,255 B2
(45) Date of Patent: Mar. 4, 2008

(54) MANAGEMENT OF CELL-SPECIFIC ADDRESS INFORMATION

(75) Inventors: Tommi Heino, Pälkäne (FI); Arto Kangas, Espoo (FI)

(73) Assignee: Nokia Corporation, Espoo (FI)

( * ) Notice: Subject to any disclaimer, the term of this patent is extended or adjusted under 35 U.S.C. 154(b) by 225 days.

(21) Appl. No.: 10/924,199

(22) Filed: Aug. 24, 2004

(65) Prior Publication Data

US 2006/0003771 A1 Jan. 5, 2006

(30) Foreign Application Priority Data

Jun. 30, 2004 (FI) .................................. 20045258

(51) Int. Cl.
*H04Q 7/20* (2006.01)
(52) U.S. Cl. .................... 455/446; 455/428; 455/432.1; 455/435.1; 455/435.2; 370/349; 370/338
(58) Field of Classification Search ................ 455/446, 455/432.1, 436, 433, 435.1, 447, 575, 466; 370/392, 329, 401, 335, 331, 349, 310
See application file for complete search history.

(56) References Cited

U.S. PATENT DOCUMENTS

| | | | |
|---|---|---|---|
| 2002/0097723 A1* | 7/2002 | Tourunen et al. ............ 370/392 |
| 2002/0191556 A1* | 12/2002 | Krishnarajah et al. ...... 370/329 |
| 2004/0095905 A1 | 5/2004 | Pecen et al. | |
| 2005/0227687 A1* | 10/2005 | Drevon ..................... 455/432.1 |
| 2006/0002365 A1* | 1/2006 | Heino et al. ................. 370/349 |

FOREIGN PATENT DOCUMENTS

WO WO 2004/043104 A1 5/2004

OTHER PUBLICATIONS

ETSI TR 144 901 V5.1.0, "Digital Cellular Telecommunication Systems (Phase 2+); External Network Assisted Cell Change (NACC) (*3GPP TR 44.901 version 5.1.0 Release 5*)", May 2002, pp. 1-23.

* cited by examiner

*Primary Examiner*—David Nguyen
(74) *Attorney, Agent, or Firm*—Squire, Sanders & Dempsey L.L.P.

(57) ABSTRACT

A method in a communication network comprising a core network and a radio access network. At least one target cell is defined for at least one originating cell controlled by a first radio access network node. A request for a packet switched communication address of a second RAN node of the target cell is delivered to the second RAN node, and a response comprising the requested address is returned. The request and the response are transferred between the first radio access network node and the second radio access network node in information containers that are transparent to the core network. The received address information is stored in the first radio access network node for facilitating delivery of data packets between the originating cell and the target cell. Based on the stored cell-specific information, information may be exchanged between the nodes controlling the cells without congesting the essential core network elements and interfaces.

18 Claims, 3 Drawing Sheets

MANAGEMENT OF CELL-SPECIFIC ADDRESS INFORMATION

FIELD OF THE INVENTION

The invention relates to telecommunications and more particularly to a method of managing cell-specific address information in a communication network, and to an apparatus implementing the invented method.

BACKGROUND OF THE INVENTION

The packet domain of modern communication systems uses packet-mode techniques to transfer user data and signaling in an efficient manner. Strict separation between the radio subsystem and network subsystem is typically maintained, which allows the network subsystem to be shared by several radio access technologies.

The air interface of the radio system, on the other hand, allows signals from many users to be multiplexed over the same physical resource. Resources are given to a user upon need and are reallocated immediately thereafter. In order to accomplish this, the radio access network comprises functional elements for controlling the use of the air interface. In order to be able to appropriately control the radio resources, these functional elements need diverse cell-specific information on cell-specific groups of other cells. For circuit switched functions the specifications define exhaustively data transfer and information exchange procedures, which ensure that valid and relevant information is provided timely for the functional control elements. However, in the packet domain, some problematic deficiencies have been identified.

For example, a Network Assisted Cell Change (NACC) function reduces the service outage time at cell reselection. NACC allows support to be given to the mobile stations as system information for the target cell before the mobile station performs the cell reselection. In order to be able to provide NACC, a functional unit handling the handover of a mobile station from a source cell to a target cell needs a certain set of system information messages of the target cell. 3GPP specifies a RAN Information Management (RIM) procedure that allows delivery of information between Radio Access Network (RAN) nodes transparently to the core network. However, RIM procedures are routed via the core network, and incurring of additional load and thus increasing the risk of congestion of the interface between the radio system and the network system should be carefully avoided.

As another example, the 3$^{rd}$ Generation Partnership Program (3GPP) standards further define network controlled cell reselection (NCCR) procedure, wherein a cell reselection is initiated for an individual mobile station by the network. In general, cell-specific load reports are delivered in specific types of circuit switched handover messages. Based on this information, load information would be available for the purpose of load-based cell reselection only in cases where the mobile station has had circuit switched connection with handovers between cells. Such dependency of packet domain operations on the circuit switched operations is not acceptable. Some advanced base station controllers allow checking of target cell loads and resource availabilities before a controlled cell change order is given. This is, however, possible only when the source and the target cells are controlled by the same base station controller. The information is equally needed in other configurations, as well.

BRIEF DESCRIPTION OF THE INVENTION

An object of the present invention is thus to provide a method and an apparatus for implementing the method so as to solve the above problems in operations of the packet domain. The objects of the invention are achieved by a method and an arrangement which are characterized by what is stated in the independent claims. The preferred embodiments of the invention are disclosed in the dependent claims.

The invention is based on the idea of facilitating exchange of cell-specific information as much as possible by means of direct packet switched communication between the radio access network nodes that control the relevant cells. This is accomplished by storing address information on at least one other cell into a radio access node that controls the use of the radio resources in one cell. Since the number of cells in mobile communication systems is typically big, a procedure that allows automatic management of the address information in the cell is established.

Based on the stored cell-specific information, any subsequent information may be exchanged directly between the nodes controlling the cells without congesting the essential core network elements and interfaces. Some further advantages of the invention are described along with the preferred embodiments.

BRIEF DESCRIPTION OF THE DRAWINGS

In the following the invention will be described in greater detail by means of preferred embodiments with reference to the attached drawings, in which

FIG. 3b illustrates the logical configuration of base station systems including the cells of FIG. 3a;

FIG. 4b illustrates an embodiment of the present invention in the configuration of FIG. 4a;

DETAILED DESCRIPTION OF THE INVENTION

The present invention is applicable to different telecommunications systems, e.g. in the GSM system together with the general packet radio service (GPRS) or in new third-generation telecommunications systems such as the UMTS (Universal Mobile Telecommunications System) or the WCDMA. In the following, the preferred embodiments of the invention are described by means of the GPRS/GSM radio system without limiting the invention to this particular radio system.

Figure 1:
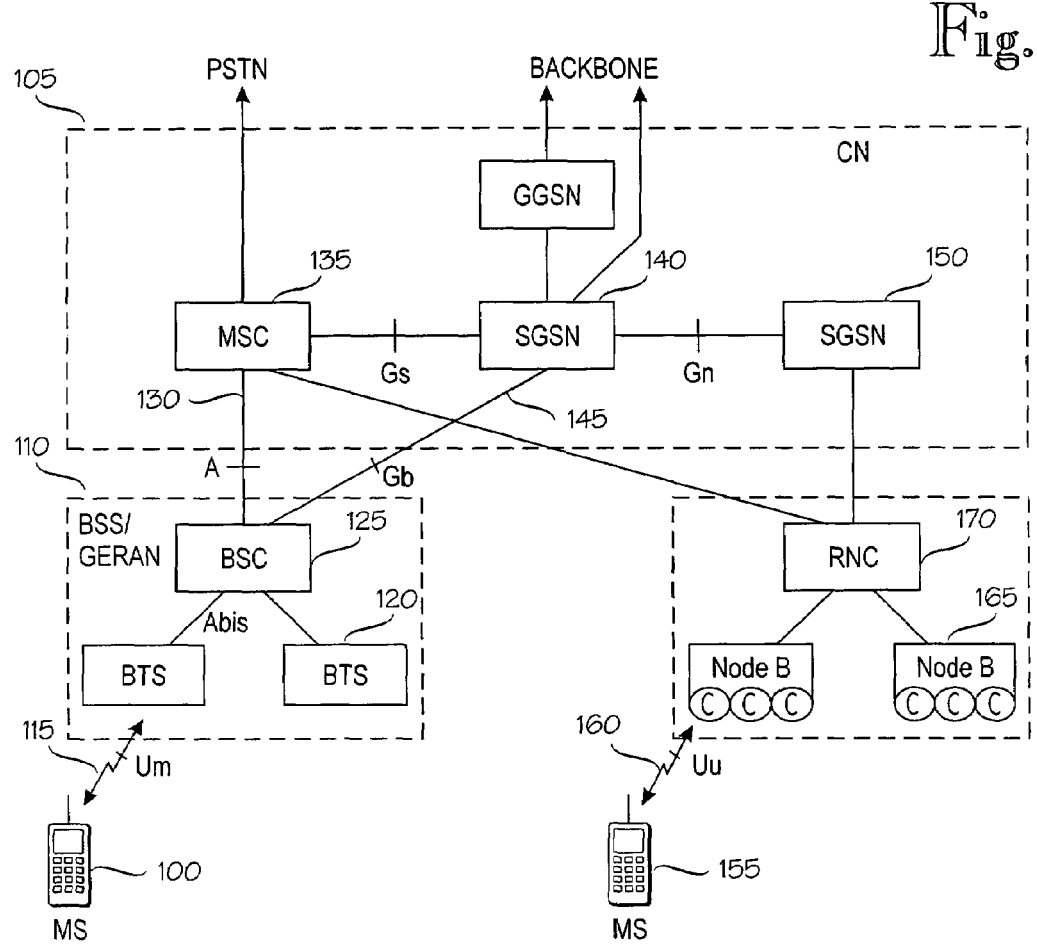
FIG. 1 illustrates the functional architecture of a communication system.

The block chart of FIG. 1 illustrates the functional architecture of a communication system that enables packet data transmission between mobile data terminals and external data networks. The first leg of the system illustrates a mode of operation of the mobile station (MS) 100 connected to the Core Network (CN) 105 via General Packet Radio Service (GPRS) system, the GSM system (Global System for Mobile communications) acting as a Radio Access Network (RAN). Generally, the basic structure of a GSM network comprises two parts: a base station system (BSS) 110 and a network subsystem (NSS). The GSM BSS communicates with mobile stations (MS) 100 via radio connections over a radio interface Um 115. In the base station system BSS 110 each cell is served by a base transceiver station (BTS) 120. The base station 120 is connected to a base station controller (BSC) 125, which controls the radio frequencies and channels used by the base station. The base station controller BSC 125 is connected over an A-interface 130 to a mobile switching centre (MSC) 135, i.e. as a part of GSM NSS to the core network NC 105 of the system.

The Serving GPRS Support Node (SGSN) 140 keeps track of the location of individual mobile stations and performs security functions and access control. The SGSN 140 is connected to the GSM base station system through the Gb interface 145. The Gateway GPRS Support Node (GGSN) 150 provides interworking with packet data networks, and is connected with SGSNs via an IP-based packet domain PLMN backbone network.

In order to use GPRS services, an MS shall first make its presence known to the network by performing a GPRS attach. This makes the MS available for SMS over GPRS, paging via the SGSN, and notification of incoming packet data. In order to send and receive packet data by means of GPRS services, the MS shall activate the Packet Data Protocol context that it wants to use. This operation makes the MS known in the corresponding GGSN, and interworking with data networks can commence.

A serving GPRS support node 140 (SGSN) is arranged to serve a mobile station by sending or receiving packets via the BSS. Each support node SGSN manages the packet data service in the area of one or more cells in a cellular packet radio network. A mobile station 10, which is in a cell, communicates with the BSS 110 over the radio interface Um 115 and further through the Gb interface 145 with the SGSN 140 to the service area of which the cell belongs. This mode of operation of the MS, when connected to the Core Network via GERAN and the A and/or Gb interfaces, is called A/Gb mode. GERAN refers to GSM/EDGE radio access network which includes GPRS and EDGE technologies.

The other leg of the system illustrates a mode of operation of the mobile station (MS) 155 connected to the Core Network (CN) 105 via a UMTS terrestrial radio access network UTRAN. The air interface between the UTRAN and the user equipment UE is called the Uu interface 160.

The UTRAN comprises one or more radio network subsystems (RNS) 165, (also called radio access networks) that are connected to the core network CN 105 over an Iu interface. Each RNS 165 is responsible for the resources of its cells. A radio network subsystem RNS 165 consists of a radio network controller (RNC) 170, and a multiplicity of nodes B 175, logically corresponding to base stations of traditional cellular systems.

The radio network controller RNC is the network node responsible for the control of the radio resources. The radio network controller RNC 170 interfaces the core network CN and also terminates the RRC protocol (Radio Resource Control) that defines the messages and procedures between the mobile and the UTRAN. It logically corresponds to a base station controller in the GSM systems. On connections between the mobile station 155 and the UTRAN, RNC 170 is the serving radio network controller. As shown in FIG. 1, RNC 170 is connected to two CN nodes (MSCNLR 135 and SGSN 140). In some network topologies it is also possible that one RNC is connected to one or more than two CN nodes which may be of similar or different type. For example, an RNC can be connected to several SGSNs. This mode of operation of the MS, when connected to the Core Network via GERAN or UTRAN and the Iu interface is called the Iu mode.

It should be noted that only elements and units essential for understanding the invention are illustrated in FIG. 1. For a person skilled in the art it is clear that a communication system typically comprises a plurality of elements not shown in FIG. 1.

More precisely, the specification defines the Gb interface to exist between a packet control unit (PCU) and a SGSN. The packet control unit is a functional unit responsible for various protocols in the GPRS MAC (Medium Access Control) and RLC (Radio Link Control) layers. These functions include establishment of RLC blocks for downlink transmission (towards the mobile station), de-assembly of blocks for uplink transmission (towards the network), timing of PDCH (Packet Data Channel), channel access control functions (access request and access grants) and management functions of the radio channel, such as power control, allocation and release of radio channels, broadcast of control information, etc.

Figure 2:
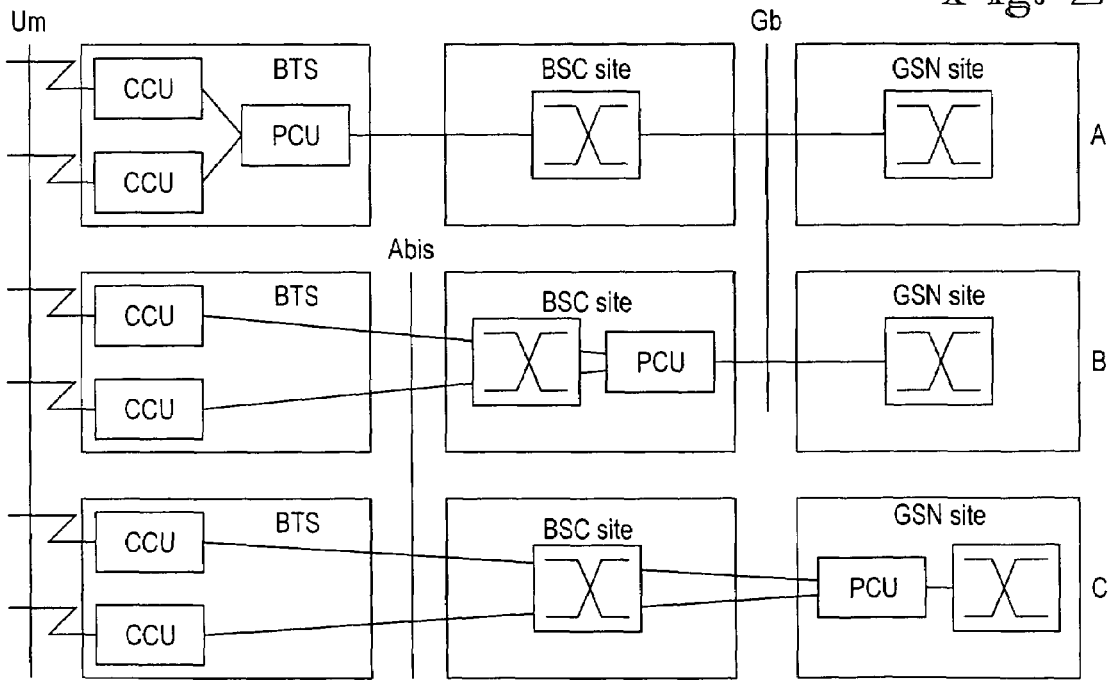
FIG. 2 illustrates alternative locations of a PCU.

The packet control unit is connected to a channel codec unit (CCU) of a base station by means of an Abis interface. The functions of the channel codec unit include channel coding functions (including co-directional error correction FEC and interleaving) and measuring functions related to the radio channel. The channel codec unit also establishes GPRS radio blocks, i.e. GPRS packets in which the data and signaling information are sent over the radio interface Um. The channel codec unit is always located in a base station, but the PCU has a variety of alternative locations, as shown in FIG. 2. When the packet control unit is positioned remote from the base station, data is transmitted between the packet control unit and channel codec units over the Abis interface using PCU frames, which are extensions of the TRAU (Transcoder/rate Adaptor Unit) frames. Both GPRS data and GPRS MAC/RLC control signals are transmitted in the PCU frames.

Option A of FIG. 2 illustrates a configuration where the packet control unit PCU and the channel codec units are situated in a base station BTS. Option B illustrates a configuration where the packet control unit PCU is situated at the base station controller BSC site, for example implemented as an adjunct unit to the BSC. Option C illustrates a configuration where the packet control unit PCU is positioned at the SGSN site. In configurations B and C the PCU is referred to as a remote PCU. The dotted line switch symbol refers to a packet-switching function, and the solid line switch symbol refers to a circuit-switching function, and the Um, Abis, and Gb interfaces are shown accordingly.

The air interface of the system in FIG. 1 allows signals from many users to be multiplexed over the same physical resource. Resources are given to a user upon need and reallocated immediately thereafter. During its operation a packet control unit in a radio access network (RAN) node, which unit is arranged to control the use and integrity of the radio resources in a communication system, needs information regarding a defined group of other RAN cells. In the following, an embodiment of the invention is described by using PCU operations and related communication as an example. As explained above, in A/Gb mode the element controlling the BTS cells is PCU and correspondingly in Iu mode the element controlling the node B cells is RNC. The scope of protection should therefore not be interpreted merely through the A/Gb mode terminology of the specific embodiment. For example, depending on the mode of operation, the PCU could be replaced with an RNC element in the description.

The type of information to be exchanged between the radio access nodes varies according to the functionality necessitating the information exchange. Correspondingly, the criterion of defining the group of cells regarding which the information is exchanged also varies for different functionalities. As an example, a network controlled cell reselection (NCCR) procedure is discussed in more detail. A mobile station may receive neighboring cell system information on a packet associated control channel (PACCH). The neighboring cell system information is contained in one or more instances of a PACKET NEIGHBOUR CELL DATA message. A mobile station, which receives this information stores the last received set of the information for at least one cell. The received system information is valid for 30 seconds and can be used for initial access when entering a designated neighbor cell.

When a cell reselection is initiated by the network, the cell change procedure is started by sending a PACKET CELL CHANGE ORDER message to the mobile station on the packet common control channel (PCCCH) or packet associated control channel (PACCH). The PACKET CELL CHANGE ORDER message comprises characteristics of the new cell and a variety of relevant parameters. The PACKET CELL CHANGE ORDER message may also comprise the CONTAINER_ID referring to the one included in the received instances of the PACKET NEIGHBOUR CELL DATA message. This is in order to map the cell identity to the container identity for which neighbor cell information was received in the PACKET NEIGHBOUR CELL DATA messages. In managing the procedure, the PCU needs to know the status of traffic load in cells that are close to the current location of the mobile station. In terms of the present invention, the type of information in this example thus comprises cell load reports, and the criterion for choosing relevant cells for the group of cells is that the cell should be a neighbor cell to the cell currently serving the mobile station.

As a further example of functionalities necessitating exchange of information between RAN nodes, a base station system GPRS protocol (BSSGP) flush procedure can be mentioned. BSSGP is a protocol that conveys routing information and quality of service related information between a base station system (BSS) and a serving GPRS support node (SGSN). BSSGP supports the BSSGP virtual connections (BVC) so that each cell always has one BVC over the Gb interface, and supports both cell-specific (BVC) and MS-specific flow control. On receipt of a downlink logical link control (LLC) protocol data unit, a BSS will either delete queued LLC protocol data units of a defined logical link, identified by a temporary logical link identity (TLLI), or move the queued LLC protocol data units from an old to a new BVC. In a case where the mobile station has an existing BSS context and the BSS is not able to move the queued LLC protocol data units, the BSS moves the BSS context from the old to a new BVC, even if the new BVC is not able to offer the same quality of service (QoS) parameters. The type of information to be exchanged during flush operations comprises LLC protocol data units and/or QoS parameters, and the group of relevant cells comprises at least one target cell at cell change.

For a person skilled in the art it is clear that the invented solution can be applied to various types of information and differently chosen groups of cells without deviating from the scope of protection.

In the following an embodiment based on NCCR is described in more detail. According to the GSM/3G specifications, the BSS and a cell within the BSS are identified by adding a Cell Identity (CI) to the location area or routeing area identification. The CI is of fixed length with 2 octets and it can be coded using a full hexadecimal representation. The Cell Global Identification is the concatenation of the Location Area Identification and the Cell Identity. Cell Identity is unique within a location area. Neighboring relates herein to a criterion for choosing the relevant cells for the load reporting functionality, and generally refers to a cell the area of which is limited to or overlaps the area of the cell concerned.

Figure 3A:
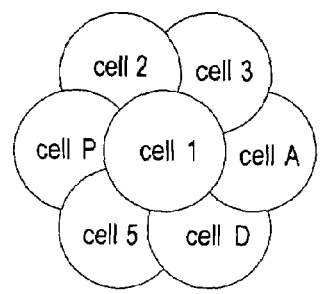
FIG. 3a illustrates a configuration of a group of neighboring cells.
Figure 3B:
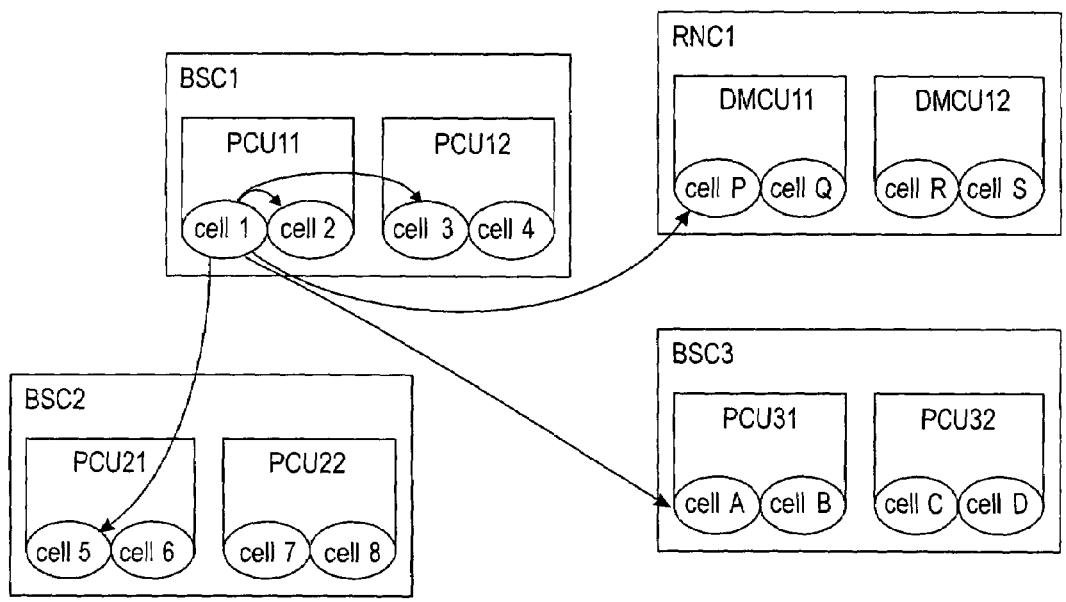

FIG. 3a illustrates configuration of a group of neighboring cells, and FIG. 3b illustrates the logical configuration of base station systems including these cells. In the embodiment of FIGS. 3a and 3b the units responsible for controlling packets are shown according to option B of FIG. 2, i.e. as located in BSC sites. BSC1 comprises two packet control units, PCU11 and PCU12. PCU11 controls cells cell1 and cell2, and PCU12 controls cells cell3 and cell4. BSC2 also comprises two packet control units, PCU21 and PCU22. PCU21 controls cells cell5 and cell6, and PCU22 controls cells cell7 and cell8. BSC3 also comprises two packet control units, PCU31 and PCU32. PCU31 controls cells cellA and cellB, and PCU32 controls cells cellC and cellD. FIG. 3b shows further a RNC comprising two UTRAN packet control elements, here denoted as DMCU, that correspond to GERAN PCUs. RNC comprises two packet control units, RMCU11 and RMCU12. RMCU11 controls cells cellP and cellQ, and RMCU12 controls cells cellR and cellS.

In the beginning the mobile station is in cell 1 of BSC1, and as can be seen in FIG. 3a, its neighboring cells are cell2 and cell3 of BSC1, cell 5 of BSC2, cellA of BSC3 and cellP. In order to be able to properly implement NCCR, PCU11 should know the load status in each of these neighboring cells. A prior art PCU knows the neighboring cell IDs, but any other address information is not inherently stored in the packet control units.

As discussed in the background of the invention, RIM procedures allow exchange of information between applications within RAN nodes. RIM allows the source BSS to send a message on the Gb interface to its SGSN including the source and destination addresses. All the messages used for the exchange of RIM information contain in their header the addresses of the source and destination BSSs. Source and destination addresses have the same format. Each address contains a Mobile Country Code (MCC), Mobile Network Code (MNC), Location Area Code (LAC), Routeing Area Code (RAC) and Cell Identity (CI).

Based on the Routeing Area Identity (MCC+MNC+LAC+RAC) of the destination BSS address, the SGSN decides whether or not it is connected to the destination BSS. If the SGSN is not connected to the destination BSS, it shall use the Routing Area Identification (RAI) to route the message to the correct SGSN via the Gn interface. The SGSN connected to the destination BSS decides which BSS to send it to on the basis of the CI of the destination address.

However, a packet control unit in a BSS controls its own cells and may know the cell IDs of the group of cells that fulfill the relevance criterion, but it does not inherently know the address for packet switched communication of the packet control unit that controls a specific cell. This means that for PS communication, the addresses of the group of cells should be manually configured and maintained for each cell in the packet control unit. For example in the embodiment of FIGS. 3a and 3b, in order to allow packet switched delivery of load reports from the neighboring cells cell2, cell3, cell5, cellA and cellP, the IP addresses of the packet control units PCU12, PCU21, PCU31 and DMCU11 should be manually configured to PCU11. Considering the amounts of cells in practical implementations, it is clear that such amounts of manual operations are not possible.

Figure 4A:
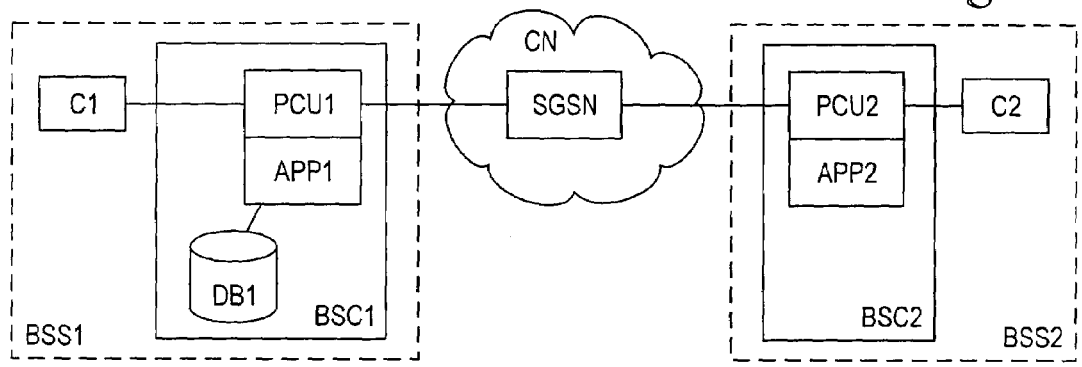
FIG. 4a illustrates a configuration of two separate base station systems BSS1 and BSS2.

In the following the invented method is described by means of a GERAN-based system configuration. It should be noted that for clarity, only elements necessary for illustrating the invention are shown, and only in one possible configuration. For a person skilled in the art it is clear that other configurations are possible, and that existing and future technologies facilitating the features claimed in the independent claims fall within the scope of protection. FIG. 4a shows a logical configuration of two network cells and FIG. 4b shows a flow chart illustrating the steps of the embodied method of the present invention, wherein the method facilitates management of cell-specific address information for the operations of the first cell BTS1.

Figure 4B:
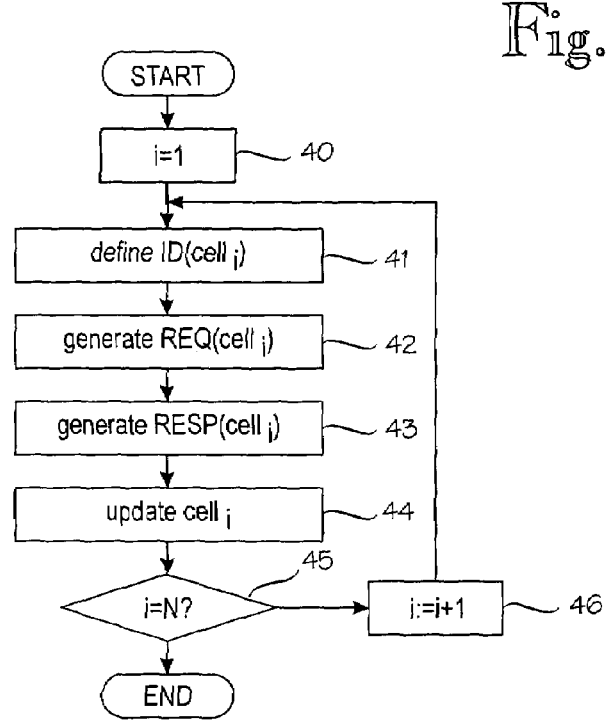

FIG. 4a illustrates a configuration of two separate base station systems BSS1 and BSS2, and FIG. 4b illustrates an embodiment of the present invention in the configuration of FIG. 4a. The embodiment of FIG. 4a is illustrated with option B of FIG. 2, i.e. a packet control unit PCU1 responsible for cell CI is an adjunct unit of the base station controller BSC1 of BSS1. Correspondingly, a packet control unit PCU2 responsible for cell C2 is an adjunct unit of the base station controller BSC2 of BSS2. Base station systems BSS1 and BSS2 are interconnected via a core network CN. In FIG. 4a, a configuration with a serving support node SGSN serving both base station controllers BSC1 and BSC2 is shown as an example. In the invention the core network transfers the relevant information transparently, and thus the configuration of the core network elements is not, as such, relevant for the scope of protection. Transparency in this context pertains to a facility that allows a message to pass through the core network without the core network interpreting the content of the message. A cell may correspond to a base station BTS or a node B. Alternatively a base station or a node B site may comprise several cells that are identified with different cell IDs.

RIM procedures provide an information transfer mechanism for exchanging information between applications within base station systems BSS1 and BSS2. In this embodiment the packet control units PCU1 and PCU2 comprise applications APP1, APP2 that are arranged to exchange information using the RAN Information Management (RIM) procedures. The RAN information is specified in section 8.1.5. of the 3GPP TS 23.060 V5.8.0 (2004-03) Technical Specification, 3rd Generation Partnership Project; Technical Specification Group Services and System Aspects; General Packet Radio Service (GPRS); Service description; Stage 2, (Release 5), which is incorporated herein by reference.

Consequently, the application in BSS1 first defines a group of cells (step 41), comprising one or more (up to N) radio cells of the communication system, that are, according to a defined selection criterion, relevant to a cell C1. The selection criterion may be, for example that the cells cell1, i=1, ..., N are neighbor cells of C1. Starting from the first of the neighboring cells C2, the application generates a request that includes the cell identification of the neighbor cell C2 (step 42) and an information container that, according to the RIM procedure, shall not be interpreted by the Core Network nodes. The information container comprises a defined requesting application element to be interpreted by the application is the receiving end. From the Routeing Area Identity of the destination BSS2 address, the core network shall decide the destination base station subsystem BSS2. If the SGSN were not connected to the destination BSS2, it would use the RAI to route the message to the correct SGSN via the Gn interface. The SGSN connected to the destination BSS2 decides which BSS2 to send the message to on the basis of the cell identification of the destination address.

The application in BSS2 receives the requesting application element in the information container and generates (step 43) a response including an address information element that comprises the address for packet switched information transfer in the communication system of FIG. 4a. For example, the address may the IP address of the BSC2. The response is transferred from BSS2 to BSS1, again according to RIM procedures. APP1 is further connected to a database DB1 in BSC1, and in response to receiving the address information element updates the address information to the database DB1 (step 44).

Hereafter the application checks (step 45) whether there exists any other relevant cells. If yes, the procedure is repeated for each of the relevant cells. If not, the procedure will terminate.

Figure 5:
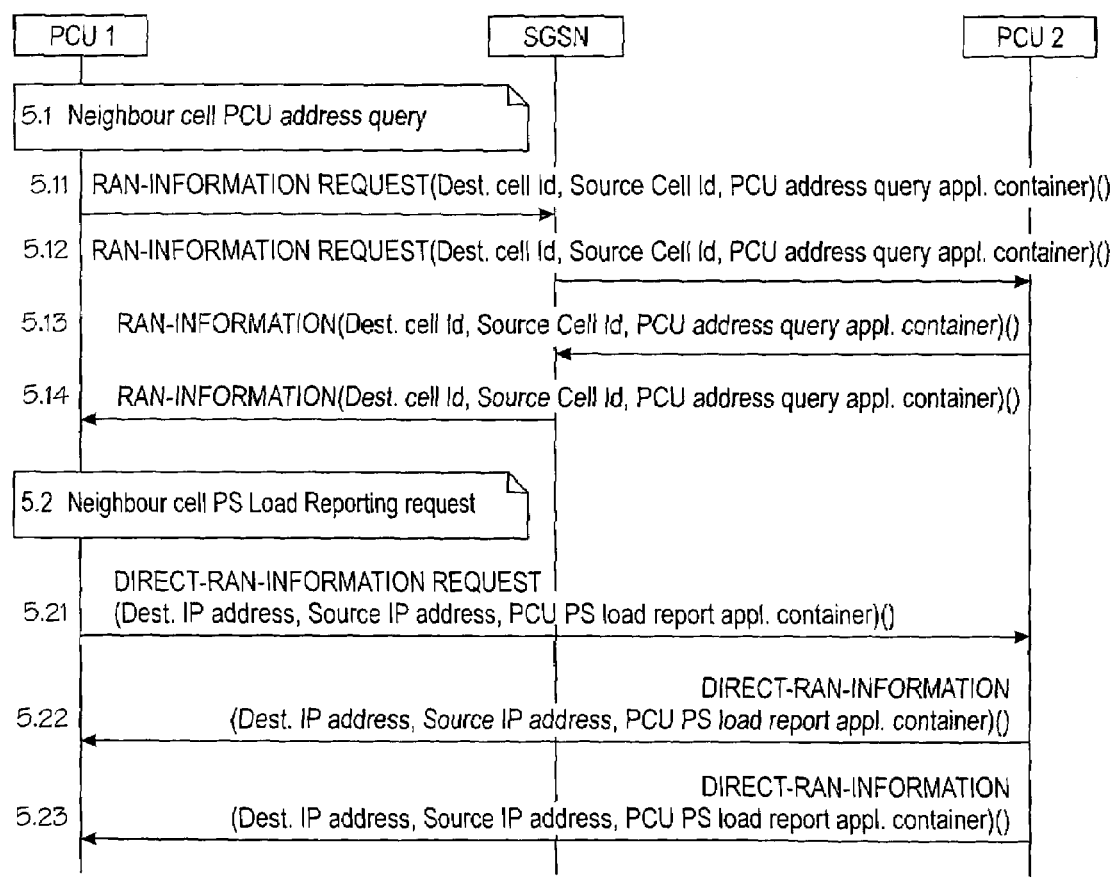
FIG. 5 illustrates an exemplary signaling sequence of neighbor cell PCU address query.

FIG. 5 illustrates, as an example, a signaling sequence of a neighbor cell PCU address query used to allow subsequent delivery of neighbor cell PB load reporting requests without unnecessarily loading the SGSN elements that serve the BSS elements including the packet control elements PCU1 and PCU2. It should be noted that the signaling messages are shown to illustrate the logical elements exchanging the information and the information content of the exchanged messages. The scope of protection is not limited to the terms and expressions used in the description. The first phase is the neighbor cell PCU address query (5.1) that is initiated with a RAN-INFORMATION REQUEST-message (5.11). The message carries the target cell ID (ID-D), the source cell ID (ID-S) and a PCU address query application container (AQ-C). SGSN receives the signal and routes the RAN-INFORMATION REQUEST-message to BSS2 as described above. PCU2 receives the message and generates a RAN-INFORMATION-message (5.13) comprising the IP address of PCU2 in the PCU address query application container, and forwards the message to SGSN, who routes the message (5.14) to PCU1. The IP address of PCU2 is stored in PCU1.

The second phase illustrates packet switched communication for exchanging load report information from the target cell (5.2). The procedure is initiated by a DIRECT-RAN-INFORMATION-REQUEST-message (5.21) from PCU1 to PCU2. The message includes IP addresses of PCU1 and PCU2, and a PCU PS load report application container carrying an application element to be interpreted by a corresponding application in the receiving end. Reception of the application element in PCU2 triggers delivery of load reports of the target cell from PCU2 to PCU1. The load reports are carried in DIRECT-RAN-INFORMATION-messages, the messages including the IP address of PCU2, the IP address of PCU1 and the PCU PS load report application container.

The advantage of the present invention is that it allows a mechanism to automatically manage cell-specific address information in radio access network nodes. Furthermore, by means of the cell-specific address information, data packets may be exchanged between packet control units without incurring additional load to the Gb/Iu interface, and/or to the core network elements between the packet control units. This provides for a variety of further advantageous applications, for example the possibility to balance loads between neighboring cells independently, without dependencies on any of the circuit switched procedures of the A interface. The invented mechanism exploits existing information management procedures and can therefore be implemented without causing changes to existing system specifications.

The application may be arranged to first request and store the cell-specific address information for each of the target cells, and thereafter update the information according to a defined plan. The plan may comprise, for example, periodic updates, wherein the address information is requested and updated after defined time periods. The plan may also comprise event-based updates, or a combination of these.

The invention also allows dynamic definition of groups for a cell. For example, configurations may change: new neighboring cells may be installed and/or some existing cells may be deleted. The application may be further arranged to receive an indication on a change in the definition of the group of target cells and, in response to the indication, to update the cell-specific information automatically.

The selection criterion may be cell-specific or may be defined as a rule applicable to two or more cells. In order to avoid conflicting definitions, ubiquitous prevalence between possibly overlapping definitions is preferably defined.

Figure 6:
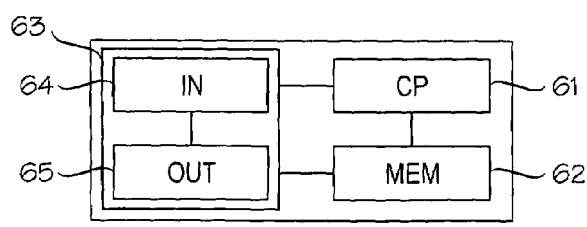
FIG. 6 illustrates the logical configuration of a packet control unit.

The implementation of the described mechanisms in a packet control unit is illustrated with reference to FIG. 6. FIG. 6 provides a description of a packet control unit that performs one or more of the previously described server functions. The packet control unit comprises processing means 61, an element that comprises an arithmetic logic unit, a number of special registers and control circuits. Connected to the processing means are memory means 62, a data medium where computer-readable data or programs or user data can be stored. The memory means typically comprise memory units that allow both reading and writing (RAM), and a memory whose contents can only be read (ROM). The unit also comprises an interface block 63 with input means 64 for inputting data for internal processing in the unit, and output means 65 for outputting data from the internal processes of the unit. Examples of said input means comprise a plug-in unit acting as a gateway for information delivered to its external connection points. Examples of said output means include a plug-in unit feeding information to the lines connected to its external connection points. The processing means 61, memory means 62, and interface block 63 are electrically interconnected for performing systematic execution of operations on the received and/or stored data according to the predefined, essentially programmed processes of the unit. In a solution according to the invention, the operations comprise a functionality for implementing the operations of the packet control unit described above.

It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
   managing cell-specific address information in a communication network comprising a core network and a radio access network;
   defining in a first radio access network node for at least one originating cell controlled by the first radio access network node at least one target cell;
   generating a request for a packet switched communication address of a second radio access network node of the at least one target cell;
   generating, in response to receiving the request in the second radio access network node, a response comprising the packet switched communication address of the second radio access network node of the at least one target cell;
   transferring the request and the response between the first radio access network node and the second radio access network node in information containers that are transparent to the core network;
   storing the received packet switched communication address of the second radio access network node in the first radio access network node.

2. The method of claim 1, comprising defining the at least one target cell on the basis of a selection criterion.

3. The method of claim 2, wherein the selection criterion defines that the at least one target cell is a neighboring cell to a current cell.

4. The method of claim 1, wherein said transferring comprises transferring the request and the response between the first radio access network node and the second radio access network node in an information container of a Radio access network Information Management (RIM) message.

5. The method of claim 1, comprising:
   detecting a change in the at least one target cell address information; and
   transferring a new request to the at least one target cell.

6. A functional unit of a radio access network said functional unit comprising:
   defining means for defining at least one target cell for at least one originating cell controlled by the functional unit, wherein the functional unit is included in a communication system comprising the radio access network and a core network;
   generating means for generating a request for a packet switched communication address of a second radio access network node of the at least one target cell;
   transmitting means for transmitting the request to the second radio access network node in an information container transparently to the core network;
   receiving means for receiving the packet switched communication address of the second radio access network node in the first radio access network node;
   storing means for storing the received packet switched communication address for facilitating delivery of data packets between the at least one originating cell and the at least one target cell.

7. The functional unit of claim 6, wherein said defining means is configured to define the at least one target cell on the basis of a selection criterion.

8. The functional unit of claim 7, wherein the selection criterion defines the at least one target cell to be a neighboring cell to a current cell.

9. The functional unit of claim 6, wherein said generating means is configured to include the request in the information container of a Radio access network Information Management (RIM) message.

10. The functional unit of claim 6, wherein:
    said receiving means is configured to receive an indication of a change in the at least one target cell address information; and
    said generating means is configured to generate a new request to the at least one target cell, in response to receiving said indication.

11. A radio access network node comprising:
    a functional unit;
    defining means for defining at least one target cell for at least one originating cell controlled by the functional unit;

generating means for generating a request for a packet switched communication address of a second radio access network node of the at least one target cell;

transmitting means for transmitting the request to the second radio access network node in an information container transparently to a core network;

receiving means for receiving the packet switched communication address of the second radio access network node in a first radio access network node;

storing means for storing the received packet switched communication address for facilitating delivery of data packets between the at least one originating cell and the at least one target cell.

12. A computer program product, embodied on a computer-readable medium, wherein execution of the computer program product in a user equipment causes a packet control unit to:

define at least one target cell for at least one originating cell controlled by a functional unit;

generate a request for a packet switched communication address of a second radio access network node of the at least one target cell;

transmit the request to the second radio access network node in an information container transparently to a core network;

receive the packet switched communication address of the second radio access network node in a first radio access network node;

store the received packet switched communication address for facilitating delivery of data packets between the at least one originating cell and the at least one target cell.

13. A functional unit of a radio access, said functional unit comprising:

a defining unit configured to define at least one target cell for at least one originating cell controlled by the functional unit, wherein the functional unit is included in a communication system comprising the radio access network and a core network;

a generating unit configured to generate a request for a packet switched communication address of a second radio access network node of the at least one target cell;

a transmitting unit configured to transmit the request to the second radio access network node in an information container transparently to the core network;

a receiving unit configured to receive the packet switched communication address of the second radio access network node in the first radio access network node;

a storing unit configured to store the received packet switched communication address for facilitating delivery of data packets between the at least one originating cell and the at least one target cell.

14. The functional unit of claim 13, wherein said defining unit is configured to define the at least one target cell on the basis of a selection criterion.

15. The functional unit of claim 14, wherein the selection criterion defines the at least one target cell to be a neighboring cell to a current cell.

16. The functional unit of claim 13, wherein said generating unit is configured to include the request in the information container of a Radio access network Information Management (RIM) message.

17. The functional unit of claim 13, wherein:

said receiving unit is configured to receive an indication of a change in the at least one target cell address information; and said generating unit is configured to generate a new request to the at least one target cell, in response to receiving said indication.

18. A radio access network node comprising:

a functional unit;

a defining unit configured to define at least one target cell for at least one originating cell controlled by the functional unit;

a generating unit configured to generate a request for a packet switched communication address of a second radio access network node of the at least one target cell;

a transmitting unit configured to transmit the request to the second radio access network node in an information container transparently to a core network;

a receiving unit configured to receive the packet switched communication address of the second radio access network node in a first radio access network node;

a storing unit configured to store the received packet switched communication address for facilitating delivery of data packets between the at least one originating cell and the at least one target cell.

* * * * *